(12) United States Patent
Sawada et al.

(10) Patent No.: US 11,065,903 B2
(45) Date of Patent: Jul. 20, 2021

(54) GRAVURE PRINTING PLATE, GRAVURE PRINTING METHOD, AND MANUFACTURING METHOD FOR ELECTRONIC COMPONENT

(71) Applicant: Murata Manufacturing Co., Ltd., Nagaokakyo (JP)

(72) Inventors: Takashi Sawada, Nagaokakyo (JP); Kenichi Togo, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/598,336

(22) Filed: May 18, 2017

(65) Prior Publication Data
US 2017/0334230 A1 Nov. 23, 2017

(30) Foreign Application Priority Data
May 19, 2016 (JP) .............................. JP2016-100062

(51) Int. Cl.
*H01G 4/012* (2006.01)
*B41N 1/16* (2006.01)
*H01G 4/12* (2006.01)
*H01G 4/248* (2006.01)
*H01G 4/30* (2006.01)

(52) U.S. Cl.
CPC .............. *B41N 1/16* (2013.01); *H01G 4/012* (2013.01); *H01G 4/12* (2013.01); *H01G 4/248* (2013.01); *H01G 4/30* (2013.01)

(58) Field of Classification Search
CPC ... B41N 1/16; B41N 1/06; H01G 4/30; H01G 4/248; H01G 4/12; H01G 4/012
See application file for complete search history.

(56) References Cited

U.S. PATENT DOCUMENTS

| | | | | |
|---|---|---|---|---|
| 2007/0107611 A1* | 5/2007 | Takashima | ................ | B41F 9/00 101/153 |
| 2013/0050818 A1* | 2/2013 | Holmes | .................. | G07D 7/207 359/463 |
| 2015/0113780 A1* | 4/2015 | Tsubokawa | .............. | H01G 4/30 29/25.41 |

(Continued)

FOREIGN PATENT DOCUMENTS

| | | |
|---|---|---|
| JP | 64-14912 A | 1/1989 |
| JP | 2012-142451 A | 7/2012 |
| JP | 2014-204081 A | 10/2014 |
| JP | 2014204081 A * | 10/2014 |

(Continued)

OTHER PUBLICATIONS

Machine translation of JP-2014204081-A (Year: 2014).*

(Continued)

*Primary Examiner* — Jose I Hernandez-Kenney
(74) *Attorney, Agent, or Firm* — Keating & Bennett, LLP

(57) ABSTRACT

A gravure printing plate includes a cylindrical or substantially cylindrical gravure roller with a peripheral surface. Plural cells corresponding to a pattern to be printed are disposed on the peripheral surface of the gravure roller. First and second regions are provided on the peripheral surface of the gravure roller. The pattern to be printed includes at least two patterns. Plural cells corresponding to one of the two patterns are disposed in the first region. Plural cells corresponding to the other one of the two patterns are disposed in the second region.

20 Claims, 5 Drawing Sheets

(56) References Cited

U.S. PATENT DOCUMENTS

2015/0116900 A1* 4/2015 Sawada ............... H01G 4/012
361/301.4
2016/0185100 A1* 6/2016 Chassot ............. B41F 33/0045
428/195.1

FOREIGN PATENT DOCUMENTS

| JP | 2015-109413 A | 6/2015 |
| JP | 2016-506320 A | 3/2016 |

OTHER PUBLICATIONS

"region." In Collins English Dictionary, edited by Collins Dictionaries. 12th ed. Collins, 2014. https://search.credoreference.com/content/entry/hcengdict/region/0?institutionId=743 (Year: 2014).*

Bank of Japan. Banknotes and currency currently issued, retrieved from https://www.boj.or.jp/en/note_tfjgs/note/valid/issue.htm/#p01 (of record, hereafter "BOJ") (Year: 2020).*

1000 Yen Bank Note [image] (2011). Retrieved from https://en.wikipedia.org/wiki/1000_yen_note#/media/File:1000_yen_banknote_2004.jpg on Sep. 13, 2020 (hereafter "1000 Yen Banknote") (Year: 2011).*

Official Communication issued in corresponding Korean Patent Application No. 10-2017-0060034, dated Mar. 20, 2018.

Official Communication issued in corresponding Japanese Patent Application No. 2016-100062, dated Jan. 7, 2020.

"Banknotes and currency currently issued, the Bank of Japan"; URL: https://www.boj.or.jp/.note_tfjgs/note/valid/issue.htm#p04; Searching date: Jun. 9, 2020; pp. 1-5.

* cited by examiner

GRAVURE PRINTING PLATE, GRAVURE PRINTING METHOD, AND MANUFACTURING METHOD FOR ELECTRONIC COMPONENT

CROSS REFERENCE TO RELATED APPLICATIONS

This application claims the benefit of priority to Japanese Patent Application No. 2016-100062 filed on May 19, 2016. The entire contents of this application are hereby incorporated herein by reference.

BACKGROUND OF THE INVENTION

1. Field of the Invention

The present invention relates to a gravure printing plate, a gravure printing method, and a manufacturing method for an electronic component. More specifically, the present invention relates to a gravure printing plate preferably for use in printing an electrode pattern of an electronic component with a paste, a gravure printing method, and a manufacturing method for an electronic component.

2. Description of the Related Art

Electronic components, such as multilayer ceramic capacitors, are typically manufactured in the following manufacturing process. Ceramic green sheets on which unfired inner electrode patterns are printed are stacked on each other so as to form a mother multilayer body. The mother multilayer body is then cut into individual raw multilayer body chips. The raw multilayer body chips are then fired. Multilayer ceramic capacitors are manufactured in this manner.

In the manufacturing process for these electronic components, to form inner electrodes by printing inner electrode patterns on the ceramic green sheets, two inner electrode patterns are screen-printed on different ceramic green sheets by using different screens, as disclosed in Japanese Unexamined Patent Application Publication No. 64-14912. Then, ceramic green sheets on which one inner electrode pattern is printed and ceramic green sheets on which the other inner electrode pattern is printed are alternately stacked on each other.

In the above-described manufacturing process, after different ceramic green sheets on which different inner electrode patterns are printed are prepared and are then alternately stacked on each other, the resulting mother multilayer body is divided into individual multilayer body chips. In this case, to adjust the positions at which the mother multilayer body is divided, highly precise control is required for adjusting the positions at which the inner electrode patterns are printed on the ceramic green sheets and the positions at which the ceramic green sheets are stacked on each other. This decreases the productivity of electronic components.

SUMMARY OF THE INVENTION

Accordingly, preferred embodiments of the present invention provide a gravure printing plate, a gravure printing method, and a manufacturing method for an electronic component that improve productivity.

According to a preferred embodiment of the present invention, a gravure printing plate includes a substantially cylindrical gravure roller including a peripheral surface and plural cells. The plural cells corresponding to a pattern to be printed are disposed on the peripheral surface of the gravure roller. At least two regions are provided on the peripheral surface of the gravure roller. The pattern to be printed includes at least two patterns. Plural cells corresponding to one of the at least two patterns are disposed in one of the at least two regions. Plural cells corresponding to another one of the at least two patterns are disposed in another one of the at least two regions.

In the gravure printing plate, plural cells corresponding to one of the at least two patterns may preferably be disposed in one of the at least two regions as a stripe-shaped pattern continuously disposed along a rotation direction of the gravure roller.

In the gravure printing plate, plural cells corresponding to one of the at least two patterns may preferably be disposed in one of the at least two regions, defining a bar shape which is continuously disposed along a rotation direction of the gravure roller and which has a predetermined width in a direction perpendicular or substantially perpendicular to the rotation direction of the gravure roller.

In the gravure printing plate, plural cells corresponding to another one of the at least two patterns may preferably be disposed in another one of the at least two regions as a stripe-shaped pattern continuously disposed along a direction perpendicular or substantially perpendicular to a rotation direction of the gravure roller.

In the gravure printing plate, the at least two regions may preferably be arranged side by side in a rotation direction of the gravure roller.

According to a preferred embodiment of the present invention, a gravure printing method includes a step of performing printing by applying a printing material to a surface of a printing medium by using the above-described gravure printing plate.

In the gravure printing method, in the step of performing printing, printing speeds for the at least two regions may preferably be the same or substantially the same.

According to a preferred embodiment of the present invention, a manufacturing method for an electronic component includes a step of performing printing by applying a conductive paste to a surface of a substrate for the electronic component by using the above-described gravure printing plate.

In the manufacturing method, in the step of performing printing, printing speeds for the at least two regions may preferably be the same or substantially the same.

With the above-described configuration, at least two patterns are able to be printed at one time. This makes it possible to control adjustments to the printing positions and the stacking positions more easily than when two or more patterns are separately printed. The dividing positions of a mother multilayer body are thus able to be adjusted easily. As a result, the productivity is improved.

According to various preferred embodiments of the present invention, it is possible to provide a gravure printing plate, a gravure printing method, and a manufacturing method for an electronic component that improve productivity.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

An electronic component manufactured by using a gravure printing plate according to a preferred embodiment of the present invention will be described below. In this preferred embodiment, a multilayer ceramic capacitor (three-terminal multilayer ceramic capacitor) is used as an example of the electronic component.

Figure 1:
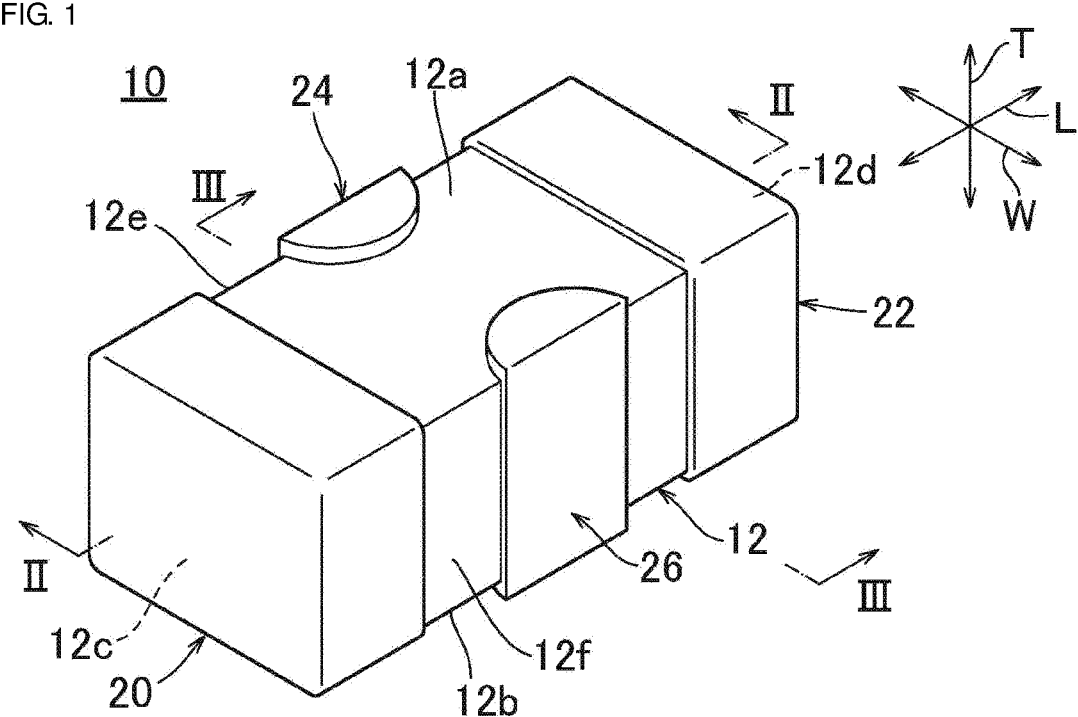
FIG. 1 is an external perspective view illustrating an example of the configuration of a multilayer ceramic capacitor manufactured by using a gravure printing plate according to a preferred embodiment of the present invention.
Figure 2:
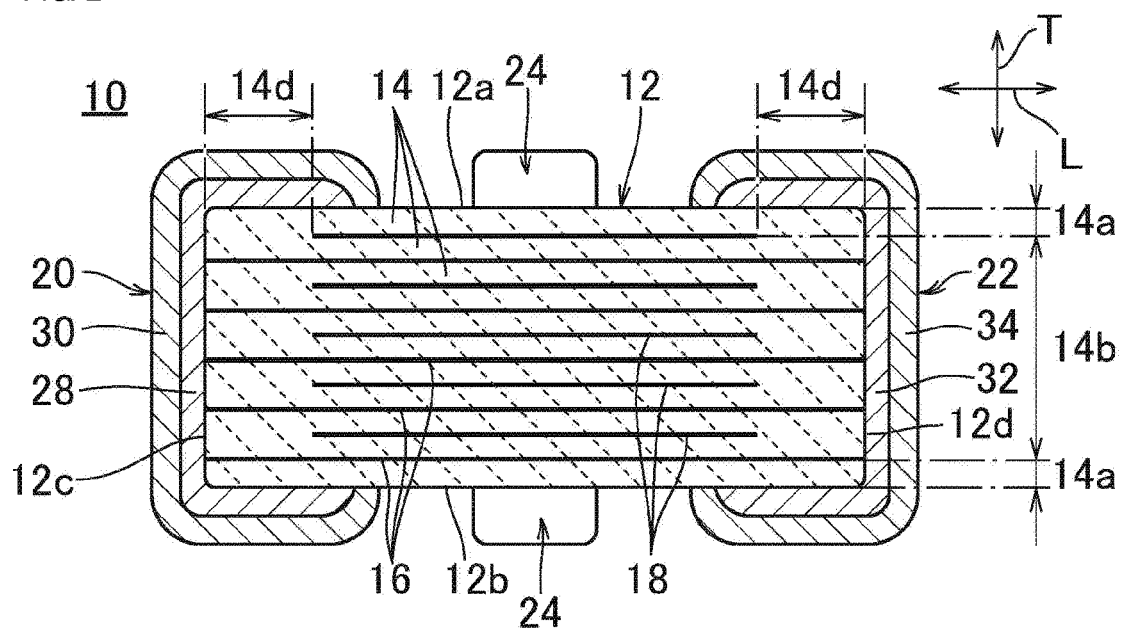
FIG. 2 is a sectional view taken along line II-II in FIG. 1.
Figure 3:
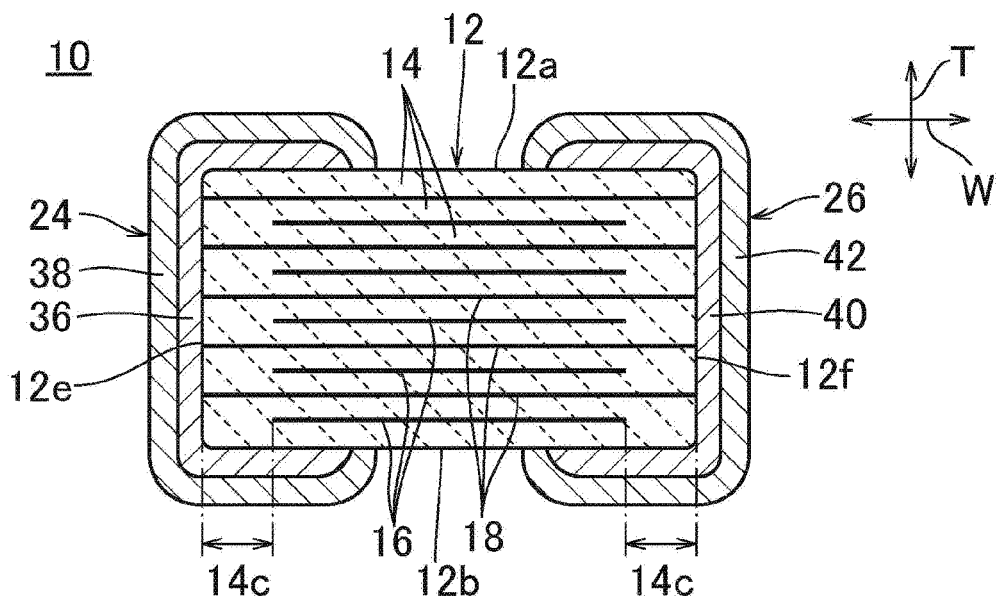
FIG. 3 is a sectional view taken along line III-III in FIG. 1.

FIG. 1 is an external perspective view illustrating an example of the configuration of a multilayer ceramic capacitor (three-terminal multilayer ceramic capacitor) 10 manufactured by using a gravure printing plate according to this preferred embodiment. FIG. 2 is a sectional view taken along line II-II in FIG. 1. FIG. 3 is a sectional view taken along line III-III in FIG. 1.

As shown in FIGS. 1 through 3, the multilayer ceramic capacitor 10 includes a multilayer body 12 preferably with a rectangular or substantially rectangular parallelepiped shape, for example.

The multilayer body 12 includes plural ceramic layers 14 stacked on each other, plural first inner electrodes 16, and plural second inner electrodes 18. The multilayer body 12 also includes first and second main surfaces 12a and 12b opposing each other in a thickness direction T, first and second end surfaces 12c and 12d opposing each other in a longitudinal direction L perpendicular or substantially perpendicular to the thickness direction T, and first and second side surfaces 12e and 12f opposing each other in a widthwise direction W perpendicular or substantially perpendicular to the thickness direction T and the longitudinal direction L. In the multilayer body 12, corner portions and ridge portions are preferably rounded. The corner portions are portions where three adjacent surfaces of the multilayer body 12 cross each other. The ridge portions are portions where two adjacent surfaces of the multilayer body 12 cross each other.

Concerning the dimensions of the multilayer body 12, the dimension in the longitudinal direction L (hereinafter may also be called "the length L") preferably is about 0.6 mm to about 3.2 mm, the dimension in the widthwise direction W (hereinafter may also be called "the width W") preferably is about 0.3 mm to about 2.5 mm, and the dimension in the thickness direction T (hereinafter may also be called "the thickness T") preferably is about 0.3 mm to about 2.5 mm, for example. The dimensions of the multilayer body 12 may be measured by a microscope.

The ceramic layers 14 include outer layer portions 14a and an inner layer portion 14b. The outer layer portions 14a are located near the first and second main surfaces 12a and 12b. The outer layer portions 14a correspond to the ceramic layer 14 positioned between the first main surface 12a and the inner electrode closest to the first main surface 12a and the ceramic layer 14 positioned between the second main surface 12b and the inner electrode closest to the second main surface 12b. The area sandwiched between the outer layer portions 14a is the inner layer portion 14b.

The ceramic layers 14 may be made of a dielectric material. As a dielectric material, a dielectric ceramic material containing barium titanate, calcium titanate, strontium titanate, or calcium zirconate as a primary component may be used. Alternatively, a dielectric ceramic material containing a secondary component, such as a Mn compound, a Si compound, an Al compound, a V compound, or Ni compound, in addition to the above-described primary component may be used in accordance with the desirable characteristics of the multilayer ceramic capacitor 10. In this case, the content of the secondary component is lower than that of the primary component.

The average thickness of the fired ceramic layers 14 is preferably about 0.5 µm to about 10 µm, for example.

As shown in FIGS. 2 and 3, the multilayer body 12 includes the plural first and second inner electrodes 16 and 18. The plural first and second inner electrodes 16 and 18 are buried within the multilayer body 12 such that they are alternately disposed at equal or substantially equal intervals along the thickness direction T.

Figure 4A:
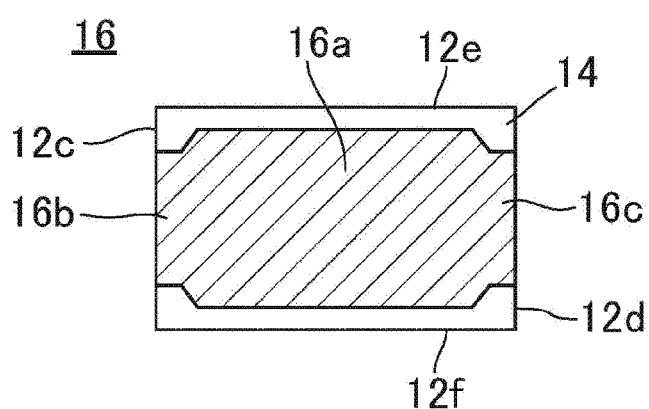
FIGS. 4A and 4B respectively illustrate a first inner electrode and a second inner electrode of the multilayer ceramic capacitor shown in FIG. 1.

As shown in FIG. 4A, the first inner electrode 16 is cross-shaped or substantially cross-shaped, and includes a first opposing electrode portion 16a and first and second extended electrode portions 16b and 16c. The first opposing electrode portion 16a opposes a second inner electrode 18. The first extended electrode portion 16b extends from the first opposing electrode portion 16a to the first end surface 12c of the multilayer body 12. The second extended electrode portion 16c extends from the first opposing electrode portion 16a to the second end surface 12d of the multilayer body 12. More specifically, the first extended electrode portion 16b is exposed on the first end surface 12c, while the second extended electrode portion 16c is exposed on the second end surface 12d. The first inner electrode 16 is exposed neither on the first side surface 12e nor the second side surface 12f. The widths W of the first and second extended electrode portions 16b and 16c are preferably smaller than the width W of the first opposing electrode portion 16a. In this case, the contact area between the ceramic layers 14 is relatively increased, and the occurrence of delamination between the ceramic layers 14 is able to be reduced. Alternatively, the widths W of the first and second extended electrode portions 16b and 16c may be the same or substantially the same as the width W of the first opposing electrode portion 16a.

Figure 4B:
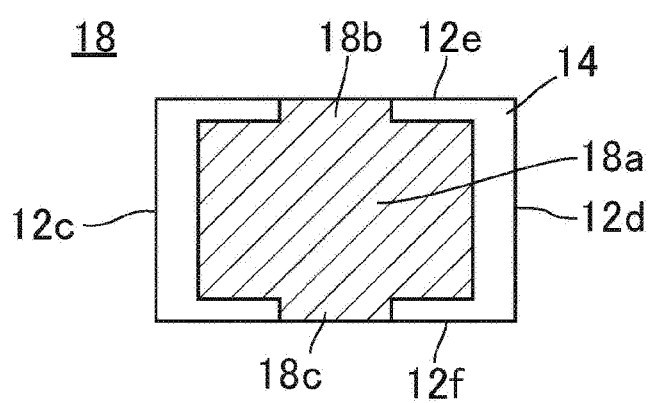

As shown in FIG. 4B, the second inner electrode 18 is cross-shaped or substantially cross-shaped, and includes a second opposing electrode portion 18a and third and fourth extended electrode portions 18b and 18c. The second opposing electrode portion 18a opposes a first inner electrode 16. The third extended electrode portion 18b extends from the second opposing electrode portion 18a to the first side surface 12e of the multilayer body 12. The fourth extended electrode portion 18c extends from the second opposing electrode portion 18a to the second side surface 12f of the multilayer body 12. More specifically, the third extended electrode portion 18b is exposed on the first side surface 12e, while the fourth extended electrode portion 18c is exposed on the second side surface 12f. The second inner electrode 18 is exposed neither on the first end surface 12c nor the second end surface 12d. The lengths L of the third and fourth extended electrode portions 18b and 18c are preferably smaller than the length L of the second opposing electrode portion 18a. In this case, the contact area between the ceramic layers 14 is relatively increased, and the occurrence of delamination between the ceramic layers 14 is able to be reduced. Alternatively, the lengths L of the third and fourth extended electrode portions 18b and 18c may be the same or substantially the same as the length L of the second opposing electrode portion 18a.

The multilayer body 12 includes side portions 14c (hereinafter called "W gaps") located between one end of the first opposing electrode portion 16a in the widthwise direction W and the first side surface 12e and between the other end of the first opposing electrode portion 16a in the widthwise direction W and the second side surface 12f. The multilayer body 12 also includes end portions 14d (hereinafter called "L gaps") located between one end of the second inner electrode 18 in the longitudinal direction L and the first end surface 12c and between the other end of the second inner electrode 18 in the longitudinal direction L and the second end surface 12d.

The first opposing electrode portion 16a of the first inner electrode 16 and the second opposing electrode portion 18a of the second inner electrode 18 oppose each other with a ceramic layer 14, which is made of a dielectric ceramic material, interposed therebetween, so as to generate electrostatic capacitance. The multilayer ceramic capacitor 10 defines and functions as a capacitor in this manner.

Each of the first and second inner electrodes 16 and 18 is parallel or substantially parallel with the first and second main surfaces 12a and 12b of the multilayer body 12.

The first and second inner electrodes 16 and 18 may be made of a suitable conductive material. The first and second inner electrodes 16 and 18 contains, for example, a metal such as Ni, Cu, Ag, Pd, or Au, or an alloy containing at least one of these metals, such as an Ag—Pd alloy. The first and second inner electrodes 16 and 18 may contain dielectric particles having the same composition as the ceramic contained in the ceramic layers 14.

A first end-surface outer electrode 20 is disposed on the first end surface 12c of the multilayer body 12. The first end-surface outer electrode 20 extends from the first end surface 12c to the first and second main surfaces 12a and 12b and the first and second side surfaces 12e and 12f so as to cover a portion of each of the first and second main surfaces 12a and 12b and a portion of each of the first and second side surfaces 12e and 12f. Alternatively, the first end-surface outer electrode 20 may be disposed only on the first end surface 12c. The first end-surface outer electrode 20 is electrically connected to the first extended electrode portion 16b of the first inner electrode 16 exposed on the first end surface 12c.

A second end-surface outer electrode 22 is disposed on the second end surface 12d of the multilayer body 12. The second end-surface outer electrode 22 extends from the second end surface 12d to the first and second main surfaces 12a and 12b and the first and second side surfaces 12e and 12f so as to cover a portion of each of the first and second main surfaces 12a and 12b and the first and second side surfaces 12e and 12f. Alternatively, the second end-surface outer electrode 22 may be disposed only on the second end surface 12d. The second end-surface outer electrode 22 is electrically connected to the second extended electrode portion 16c of the first inner electrode 16 exposed on the second end surface 12d.

A first side-surface outer electrode 24 is disposed on the first side surface 12e of the multilayer body 12. The first side-surface outer electrode 24 extends from the first side surface 12e to the first and second main surfaces 12a and 12b so as to cover a portion of each of the first and second main surfaces 12a and 12b. Alternatively, the first side-surface outer electrode 24 may be disposed only on the first side surface 12e. The first side-surface outer electrode 24 is electrically connected to the third extended electrode portion 18b of the second inner electrode 18 exposed on the first side surface 12e.

A second side-surface outer electrode 26 is disposed on the second side surface 12f of the multilayer body 12. The second side-surface outer electrode 26 extends from the second side surface 12f to the first and second main surfaces 12a and 12b so as to cover a portion of each of the first and second main surfaces 12a and 12b. Alternatively, the second side-surface outer electrode 26 may be disposed only on the second side surface 12f. The second side-surface outer electrode 26 is electrically connected to the fourth extended electrode portion 18c of the second inner electrode 18 exposed on the second side surface 12f.

As shown in FIG. 2, the first end-surface outer electrode includes, sequentially from the multilayer body 12, an underlying electrode layer 28 disposed on the surfaces of the multilayer body 12 and a plated layer 30 disposed to cover the underlying electrode layer 28. Similarly, as shown in FIG. 2, the second end-surface outer electrode 22 includes, sequentially from the multilayer body 12, an underlying electrode layer 32 disposed on the surfaces of the multilayer body 12 and a plated layer 34 disposed to cover the underlying electrode layer 32.

As shown in FIG. 3, the first side-surface outer electrode 24 includes, sequentially from the multilayer body 12, an underlying electrode layer 36 disposed on the surfaces of the multilayer body 12 and a plated layer 38 disposed to cover the underlying electrode layer 36. Similarly, as shown in FIG. 3, the second side-surface outer electrode 26 includes, sequentially from the multilayer body 12, an underlying electrode layer 40 disposed on the surfaces of the multilayer body 12 and a plated layer 42 disposed to cover the underlying electrode layer 40.

The underlying electrode layer 28 is provided on the first end surface 12c of the multilayer body 12. The end portions of the underlying electrode layer 28 preferably extend to the first and second main surfaces 12a and 12b and the first and second side surfaces 12e and 12f. However, the underlying electrode layer 28 may be provided only on the first end surface 12c. The underlying electrode layer 32 is provided on the second end surface 12d of the multilayer body 12. The end portions of the underlying electrode layer 32 preferably extend to the first and second main surfaces 12a and 12b and the first and second side surfaces 12e and 12f. However, the underlying electrode layer 32 may be provided only on the second end surface 12d.

The underlying electrode layer 36 is provided on the first side surface 12e of the multilayer body 12. The end portions of the underlying electrode layer 36 preferably extend to the first and second main surfaces 12a and 12b. However, the underlying electrode layer 36 may be provided only on the first side surface 12e. The underlying electrode layer 40 is provided on the second side surface 12f of the multilayer body 12. The end portions of the underlying electrode layer 40 preferably extend to the first and second main surfaces 12a and 12b. However, the underlying electrode layer 40 may be provided only on the second side surface 12f.

The underlying electrode layers 28, 32, 36, and 40 are each constituted by at least one of a baked layer, a resin layer, and a thin-film layer. The baked layer contains a conductive metal and a glass component. The conductive metal may be Cu, Ni, Ag, Pd, an Ag—Pd alloy, or Au. The baked layer may be constituted by multiple layers. As the glass component, glass containing B, Si, Ba, Mg, Al, or Li may be used. The baked layer is formed preferably by applying a conductive paste containing a conductive metal and a glass component to a surface of the multilayer body 12 and baking the conductive paste. The baked layer may be fired together with the multilayer body 12 or may be baked after the multilayer body 12 is fired. The thickness of the thickest portion of the baked layer is preferably about 10 μm to about 50 μm, for example.

The plated layers 30, 34, 38, and 42 are made of at least one of Cu, Ni, Ag, Pd, an Ag—Pd alloy, Au, and Sn. Each of the plated layers 30, 34, 38, and 42 may include multiple layers, and is preferably a two-layered structure in which a Sn plated layer is formed on a Ni plated layer. The Ni plated layer prevents plated layers 30, 34, 38, and 42 from being corroded by solder used to mount the multilayer ceramic capacitor 10. The Sn plated layer improves the wettability of solder so as to facilitate the mounting of the multilayer ceramic capacitor 10. The thickness of one layer forming the two-layered plated layer is preferably about 2 μm to about 8 μm, for example.

Concerning the dimensions of the multilayer ceramic capacitor 10, the length L preferably is about 0.6 mm to about 3.2 mm, the width W preferably is about 0.3 mm to about 2.5 mm, and the thickness T preferably is about 0.3 mm to about 2.5 mm, for example. The length L is not necessarily longer than the width W. The dimensions of the multilayer ceramic capacitor 10 may be measured by a microscope.

A gravure printing plate used for manufacturing the above-described multilayer ceramic capacitor 10 will be described below. The gravure printing plate is a member used to print a desired shape on the surface of a printing medium by applying a paste thereto.

Figure 5:
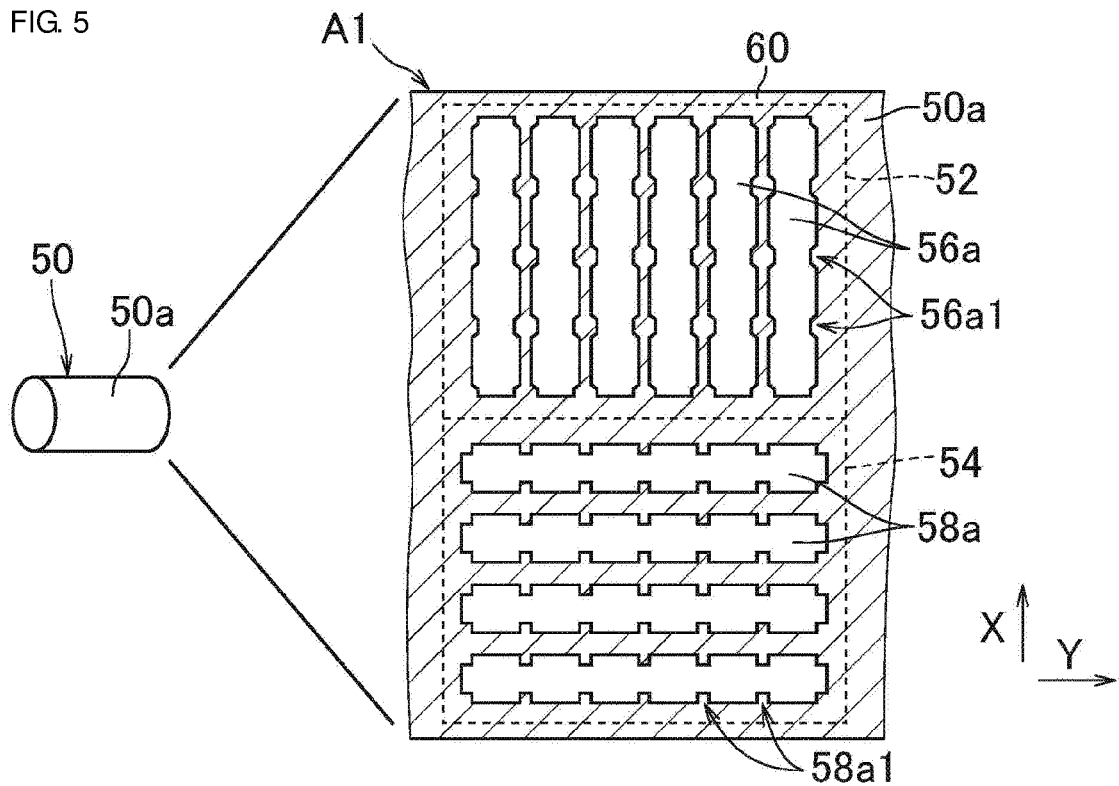
FIG. 5 illustrates an example of the configuration of a gravure printing plate according to a preferred embodiment of the present invention.

FIG. 5 illustrates a gravure printing plate A1. Plural cells corresponding to a pattern to be printed are disposed on a peripheral surface 50a of a cylindrical or substantially cylindrical gravure roller 50. At least two regions, for example, first and second regions 52 and 54, are provided on the peripheral surface 50a of the gravure roller 50. The first and second regions 52 and 54 are provided side by side along a rotation direction (X direction) of the gravure roller 50.

At least two patterns are printed in association with the cells disposed on the peripheral surface 50a of the gravure roller 50.

In the first region 52, plural cells 56a corresponding to one of the two patterns to be printed are disposed. The cells 56a are formed on the peripheral surface 50a of the gravure roller as recessed portions. A printing material, for example, a paste, is charged into the cells 56a and is transferred to the surface of a printing medium. The plural cells 56a continuously extend along the rotation direction of the gravure roller 50 to define a stripe-shaped pattern.

More specifically, each cell 56a is defined by a pattern of the cross-shaped or substantially cross-shaped first inner electrodes 16 which is continuously disposed along the rotation direction (X direction) of the gravure roller 50 without any break. Because of the configuration of this pattern, dent portions 56a1 are provided in the cell 56a. The cells 56a are disposed in multiple rows in a direction (Y direction) perpendicular or substantially perpendicular to the rotation direction of the gravure roller 50. As a result, the cells 56a are disposed in a stripe-shaped pattern in the first region 52.

In the second region 54, plural cells 58a corresponding to the other one of the two patterns are disposed. The cells 58a are formed on the peripheral surface 50a of the gravure roller 50 as recessed portions. A printing material, for example, a paste, is charged into the cells 58a and is transferred to the surface of a printing medium. The plural cells 58a continuously extend along a direction perpendicular or substantially perpendicular to the rotation direction of the gravure roller 50 to define a stripe-shaped pattern.

More specifically, each cell 58a is defined by a pattern of the cross-shaped or substantially cross-shaped second inner electrodes 18 which is continuously disposed along a direction (Y direction) perpendicular or substantially perpendicular to the rotation direction (X direction) of the gravure roller 50 without any break. Because of the configuration of this pattern, dent portions 58a1 are formed in the cell 58a. The cells 58a are disposed in multiple rows in the rotation direction of the gravure roller 50. As a result, the cells 58a are disposed in a stripe-shaped pattern in the second region 54.

A method for forming the gravure printing plate A1 will be described below.

To form plural cells corresponding to patterns to be printed, a cylindrical or substantially cylindrical metal roller is prepared. By forming cells on this metal roller, the cylindrical or substantially cylindrical gravure roller 50 is obtained. As a material for the metal roller, a suitable metal, such as stainless steel, may be used.

On the peripheral surface 50a of the gravure roller 50, two regions, that is, the first and second regions 52 and 54, are provided. A resist is printed on the peripheral surface 50a of the gravure roller 50, and is then exposed and developed by using a photolithography process.

Then, as shown in FIG. 5, in the first region 52, areas where the cells 56a corresponding to one of the two patterns to be printed will be formed (areas to be etched) are exposed. In the second region 54, areas where the cells 58a corresponding to the other one of the two patterns to be printed will be formed (areas to be etched) are exposed. Then, an etching resist film 60 is formed. The etching resist film 60 has a pattern in which areas other than the areas where the cells 56a and 58a will be formed are covered.

In the first region 52, an area where a cell 56a will be formed, which is continuously disposed along the rotation direction of the gravure roller 50, is disposed. The areas where the cells 56a will be formed are disposed in multiple rows in a direction perpendicular or substantially perpendicular to the rotation direction of the gravure roller 50.

In the second region 54, an area where a cell 58a will be formed, which is continuously disposed along a direction perpendicular or substantially perpendicular to the rotation direction of the gravure roller 50, is disposed. The areas where the cells 58a will be formed are disposed in multiple rows in the rotation direction of the gravure roller 50.

Then, the gravure roller 50 having the etching resist film 60 formed on the peripheral surface 50a is placed in an etching bath (not shown). The gravure roller 50 is set parallel or substantially parallel to a direction (axial direction)

perpendicular or substantially perpendicular to the rotation direction. While the gravure roller 50 is being maintained at this position, an etching liquid is supplied to the peripheral surface 50a of the gravure roller 50 while the gravure roller 50 is being rotated about the axis, so that the areas corresponding to the cells 56a and 58a which are not covered by the etching resist film 60 are able to be etched. As a result, the gravure printing plate A1 in which the cells 56a and 58a are formed on the peripheral surface 50a of the gravure roller 50 as recessed portions is obtained.

In this preferred embodiment, as an example of the manufacturing method for an electronic component, a manufacturing method for a multilayer ceramic capacitor will be described below. The manufacturing method will be discussed by illustration of a method for mass-producing the above-described multilayer ceramic capacitors 10. In mass production, the multilayer ceramic capacitors 10 are manufactured as a mother multilayer body including the plural multilayer bodies 12.

A ceramic paste containing ceramic powder, which is a material for the ceramic layers 14 that define the inner layer portion 14b, is applied in a sheet shape by screen printing, for example, and is then dried. As a result, a ceramic green sheet forming the inner layer portion 14b is formed and prepared as a substrate for electronic components. A ceramic paste containing ceramic powder, which is a material for the ceramic layers 14 defining the outer layer portions 14a, is applied in a sheet shape by screen printing, for example, and is then dried. As a result, a ceramic green sheet defining the outer layer portions 14a is formed and prepared.

A conductive paste for forming inner electrodes is applied to the surface of the ceramic green sheet defining the inner layer portion 14b by gravure printing using the gravure printing plate A1.

This will be discussed more specifically. A conductive paste is charged into the cells 56a, which are used to form the first inner electrodes 16, disposed in the first region 52 of the gravure printing plate A1. A conductive paste is charged into the cells 58a, which are used to form the second inner electrodes 18, disposed in the second region 54 of the gravure printing plate A1. The conductive paste charged into the cells 56a and the conductive paste charged into the cells 58a are sequentially applied to the surface of the ceramic green sheet which defines the inner layer portion 14b at the same or substantially the same speed. Then, both of the conductive paste for forming the first inner electrodes 16 and the conductive paste for forming the second inner electrodes 18 are applied onto the ceramic green sheet at the same time or substantially at the same time. In other words, both of the conductive paste for forming the first inner electrodes 16 and the conductive paste for forming the second inner electrodes 18 are applied onto the same ceramic green sheet at the same speed or substantially the same speed. The ceramic paste and the conductive paste contain a known binder and solvent, for example.

A predetermined number of ceramic green sheets coated with the conductive paste for forming the first inner electrodes 16 and the conductive paste for forming the second inner electrodes 18 are formed in accordance with the number of ceramic layers 14 to be stacked on each other.

Punching is performed on the ceramic green sheets to form portions with the patterns for the first inner electrodes 16 corresponding to the first region 52 and portions with the patterns for the second inner electrodes 18 corresponding to the second region 54. Then, the portions with the patterns for the first inner electrodes 16 and the portions with the patterns for the second inner electrodes 18 are alternately stacked on each other. Ceramic green sheets defining the outer layer portions 14a are then stacked on the above-described portions of the ceramic green sheets forming the inner layer portion 14b so as to sandwich them therebetween. The stacked ceramic green sheets are pressure-bonded to each other by isostatic pressing. As a result, a mother multilayer body is formed.

The mother multilayer body is cut into individual portions having a predetermined size, thus forming plural raw multilayer bodies 12. The raw multilayer bodies 12 may be barrel-polished so that ridge portions and corner portions can be rounded.

Then, the raw multilayer bodies 12 are fired. The multilayer bodies 12 within which the first and second inner electrodes 16 and 18 are disposed are formed in this manner. The first extended electrode portion 16b of the first inner electrode 16 extends to the first end surface 12c of the multilayer body 12, while the second extended electrode portion 16c of the first inner electrode 16 extends to the second end surface 12d of the multilayer body 12. The third extended electrode portion 18b of the second inner electrode 18 extends to the first side surface 12e of the multilayer body 12, while the fourth extended electrode portion 18c of the second inner electrode 18 extends to the second side surface 12f of the multilayer body 12. The firing temperature for the raw multilayer bodies 12 may be set suitably in accordance with the ceramic material and the conductive material used for forming the multilayer bodies 12, and may be about 900° C. to about 1300° C., for example. The ceramic green sheets and the conductive pastes for the inner electrodes are fired together.

Then, a conductive paste is applied to the first end surface 12c of the multilayer body 12 and is baked, thus forming the underlying electrode layer 28 of the first end-surface outer electrode 20. A conductive paste is applied to the second end surface 12d of the multilayer body 12 and is baked, thus forming the underlying electrode layer 32 of the second end-surface outer electrode 22. Then, a conductive paste is applied to the first side surface 12e of the multilayer body 12 and is baked, thus forming the underlying electrode layer 36 of the first side-surface outer electrode 24. A conductive paste is applied to the second side surface 12f of the multilayer body 12 and is baked, thus forming the underlying electrode layer 40 of the second side-surface outer electrode 26. The baking temperature is preferably about 700° C. to about 900° C., for example.

Then, the plated layer 30 is formed on the surface of the underlying electrode layer 28 of the first end-surface outer electrode 20, while the plated layer 34 is formed on the surface of the underlying electrode layer 32 of the second end-surface outer electrode 22. The plated layer 38 is formed on the surface of the underlying electrode layer 36 of the first side-surface outer electrode 24, while the plated layer 42 is formed on the surface of the underlying electrode layer 40 of the second side-surface outer electrode 26.

The multilayer ceramic capacitor 10 shown in FIG. 1 is manufactured by the above-described manufacturing method.

In the gravure printing plate A1, the plural cells 56a are disposed in the first region 52 on the peripheral surface 50a of the gravure roller 50f, and are formed as a stripe-shaped pattern continuously disposed along the rotation direction of the gravure roller 50. The plural cells 58a are disposed in the second region 54 on the peripheral surface 50a of the gravure roller 50, and are formed as a stripe-shaped pattern continuously disposed along a direction perpendicular or substantially perpendicular to the rotation direction of the gravure roller 50.

With a printing method using the gravure printing plate A1, even upon the occurrence of a slight printing misregistration in the rotation direction of the gravure roller 50 and a direction perpendicular or substantially perpendicular to the rotation direction, adjustment to the positions at which the ceramic green sheets are stacked on each other is able to be controlled more easily than when two or more patterns are separately printed. Thus, adjustment to the positions at which the mother multilayer body is divided is able to be controlled more easily than when two or more patterns are separately printed. As a result, the productivity is improved.

The cells 56a are not necessarily continuous along the rotation direction of the gravure roller 50. However, when dividing the mother multilayer body, if the pattern printed on the dividing surface is desirably exposed, the higher precision is necessary for the printing position, the stacking position, and the dividing position. It is thus preferable that the cells 56a be continuous along the rotation direction of the gravure roller 50.

The cells 58b are not necessarily continuous along a direction perpendicular or substantially perpendicular to the rotation direction of the gravure roller 50. However, when dividing the mother multilayer body, if the pattern printed on the dividing surface is desirably exposed, the higher precision is necessary for the printing position, the stacking position, and the dividing position. It is thus preferable that the cells 58a be continuous along a direction perpendicular or substantially perpendicular to the rotation direction of the gravure roller 50.

In the gravure printing plate A1, two regions, that is, the first and second regions 52 and 54, are arranged along the rotation direction of the gravure roller 50. The horizontal symmetry of the gravure printing plate A1 is thus high, thus increasing the printing precision. As a result, in the manufacturing method for electronic components by using the gravure printing plate A1, the productivity is further improved.

When performing gravure printing by using the gravure printing plate A1, the printing speed for the first region 52 and that for the second region 54 is able to be the same or substantially the same by rotating the gravure roller 50 at a constant speed, for example. The printing position is thus able to be easily controlled. As a result, in the manufacturing method for electronic components by using the gravure printing plate A1, the productivity is further improved.

In the multilayer ceramic capacitor 10 including the first and second inner electrodes 16 and 18 printed by using the cells 56a provided in the first region 52 and the cells 58a provided in the second region 54 of the gravure printing plate A1, the contact area between the ceramic layers 14 is relatively increased, and the occurrence of delamination between the ceramic layers 14 is able to be reduced.

Figure 6:
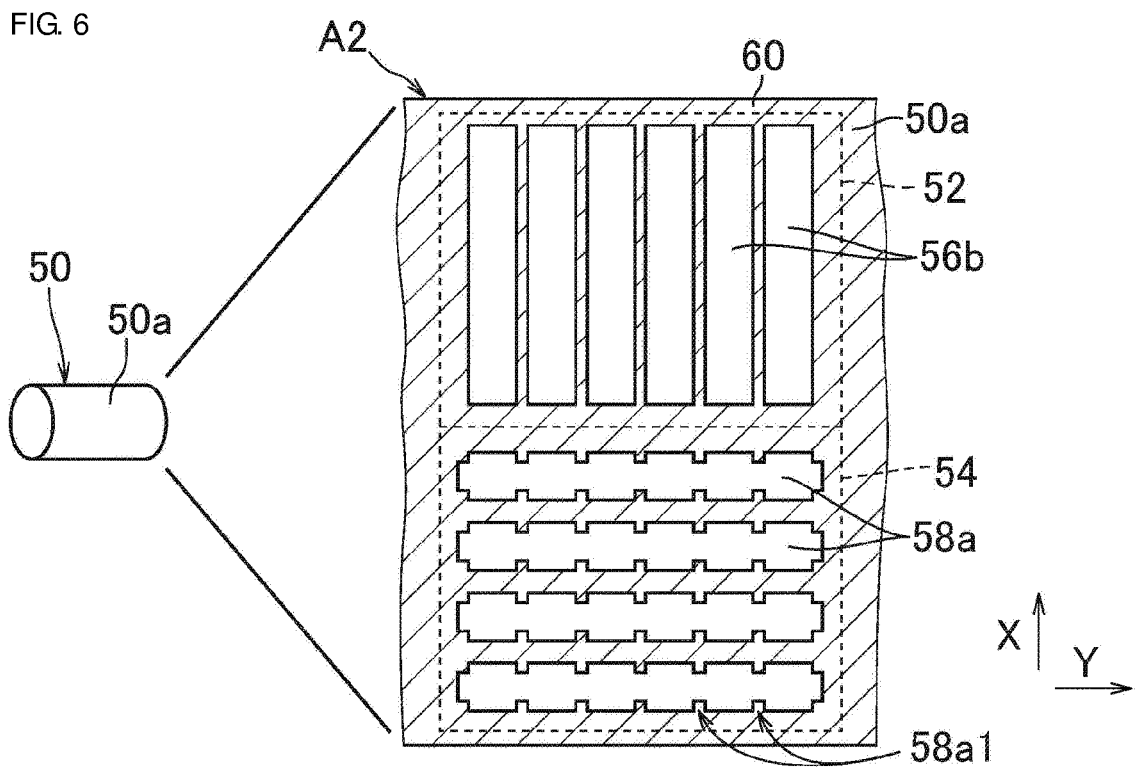
FIG. 6 illustrates the configuration of a gravure printing plate according to a first modified example of a preferred embodiment of the present invention.

FIG. 6 illustrates the configuration of a gravure printing plate according to a first modified example of a preferred embodiment of the present invention.

As in the gravure printing plate A1, in a gravure printing plate A2, plural cells corresponding to at least two patterns to be printed are disposed on a peripheral surface 50a of a cylindrical or substantially cylindrical gravure roller 50, as shown in FIG. 6. First and second regions 52 and 54 are provided on the peripheral surface 50a of the gravure roller 50 and are arranged side by side along the rotation direction (X direction) of the gravure roller 50. Cells 56b corresponding to one of the two patterns are disposed in the first region 52, while cells 58a corresponding to the other one of the two patterns are disposed in the second region 54.

The cells 58a disposed in the second region 54 of the gravure printing plate A2 are the same as those in the second region 54 of the gravure printing plate A1, and an explanation thereof will thus be omitted.

A cell 56b in the first region 52 preferably has a bar shape such that it is continuously disposed along the rotation direction (X direction) of the gravure roller 50 and has a predetermined width in a direction (Y direction) perpendicular or substantially perpendicular to the rotation direction of the gravure roller 50. The plural cells 56b are disposed in multiple rows in a direction (Y direction) perpendicular or substantially perpendicular to the rotation direction of the gravure roller 50.

In the gravure printing plate A2 of the first modified example, each of the cells 56b preferably has a bar shape such that it is continuously disposed along the rotation direction of the gravure roller 50 and has a predetermined width in a direction perpendicular or substantially perpendicular to the rotation direction of the gravure roller 50. The cells 56b are thus formed without dent portions. With this configuration, upon the occurrence of printing misregistration in the rotation direction of the gravure roller 50, adjustment to the stacking position is required only in a direction perpendicular or substantially perpendicular to the rotation direction of the gravure roller 50. More specifically, the stacking position of the pattern printed by the cells 58a in the second region 54 on the pattern printed by the cells 56b in the first region 52 is adjusted only in a direction perpendicular or substantially perpendicular to the rotation direction of the gravure roller 50. Adjustment to the stacking position is thus made more easily than by using the gravure printing plate A1. As a result, the productivity is further improved.

Upon the occurrence of stacking misregistration in the rotation direction of the gravure roller 50, that is, in the printing direction, adjustment to the stacking position is easily made, as in the occurrence of printing misregistration. As a result, the productivity is further improved.

In gravure printing, the position precision in a direction perpendicular or substantially perpendicular to the rotation direction of a gravure printing plate is likely to be higher than that in the rotation direction of the gravure printing plate. It is thus possible to make it easier to adjust the printing position of the pattern printed by the cells 58a in the second region 54 of the gravure printing plate A2 on the pattern printed by the cells 56b in the first region 52.

Figure 7:
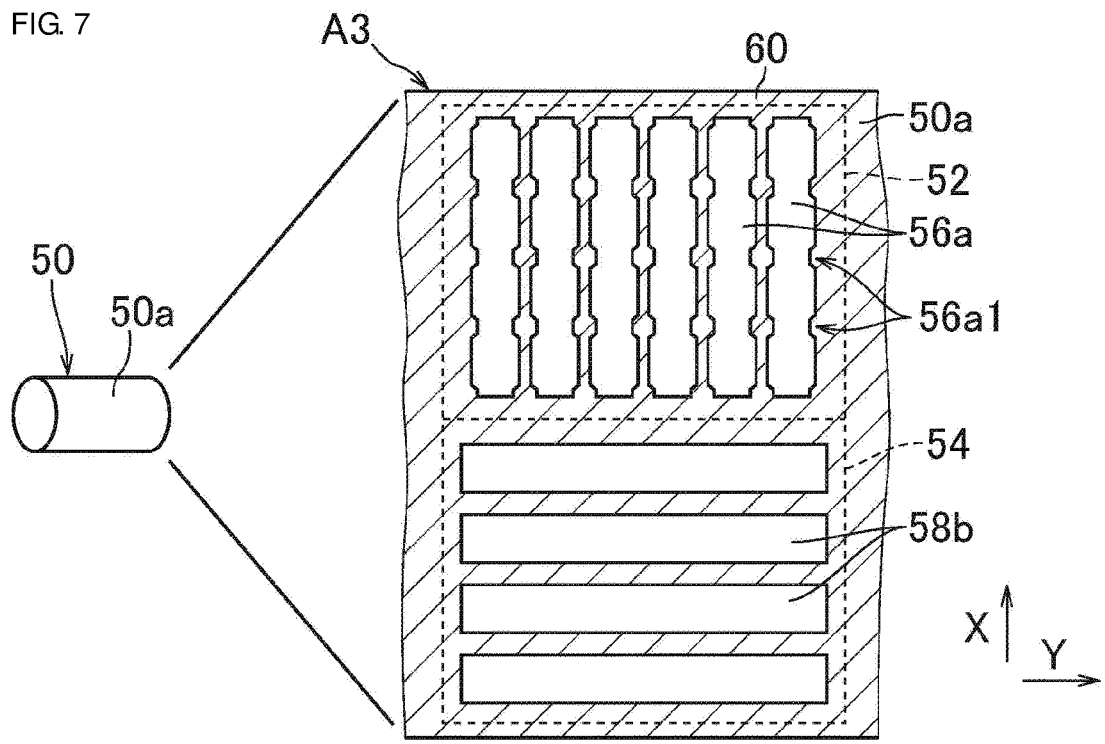
FIG. 7 illustrates the configuration of a gravure printing plate according to a second modified example of a preferred embodiment of the present invention.

FIG. 7 illustrates the configuration of a gravure printing plate according to a second modified example of a preferred embodiment of the present invention.

As in the gravure printing plate A1, in a gravure printing plate A3, plural cells corresponding to at least two patterns to be printed are disposed on a peripheral surface 50a of a cylindrical or substantially cylindrical gravure roller 50, as shown in FIG. 7. First and second regions 52 and 54 are provided on the peripheral surface 50a of the gravure roller 50 and are arranged side by side along the rotation direction (X direction) of the gravure roller 50. Cells 56a corresponding to one of the two patterns are disposed in the first region 52, while cells 58b corresponding to the other one of the two patterns are disposed in the second region 54.

The cells 56a disposed in the first region 52 of the gravure printing plate A3 are the same as those in the first region 52 of the gravure printing plate A1, and an explanation thereof will thus be omitted.

A cell 58b in the second region 54 preferably has a bar shape such that it is continuously disposed along a direction (Y direction) perpendicular or substantially perpendicular to the rotation direction (X direction) of the gravure roller 50 and has a predetermined width in the rotation direction of the gravure roller 50. The plural cells 58b are disposed in multiple rows in the rotation direction of the gravure roller 50.

In the gravure printing plate A3 of the second modified example, each of the cells 58b preferably has a bar shape such that it is continuously disposed along a direction perpendicular or substantially perpendicular to the rotation direction of the gravure roller 50 and has a predetermined width in the rotation direction of the gravure roller 50. The cells 58b are thus formed without dent portions. With this configuration, upon the occurrence of printing misregistration in a direction perpendicular or substantially perpendicular to the rotation direction of the gravure roller 50, adjustment to the stacking position is required only in the rotation direction of the gravure roller 50. More specifically, the stacking position of the pattern printed by the cells 58b in the second region 54 on the pattern printed by the cells 56a in the first region 52 is adjusted only in the rotation direction of the gravure roller 50. Adjustment to the stacking position is thus made more easily than by using the gravure printing plate A1. As a result, the productivity is further improved.

Upon the occurrence of stacking misregistration in a direction perpendicular or substantially perpendicular to the rotation direction of the gravure printing plate A3, that is, in a direction perpendicular or substantially perpendicular to the printing direction, adjustment to the stacking position is easily made, as in the occurrence of printing misregistration. As a result, the productivity is further improved.

Figure 8:
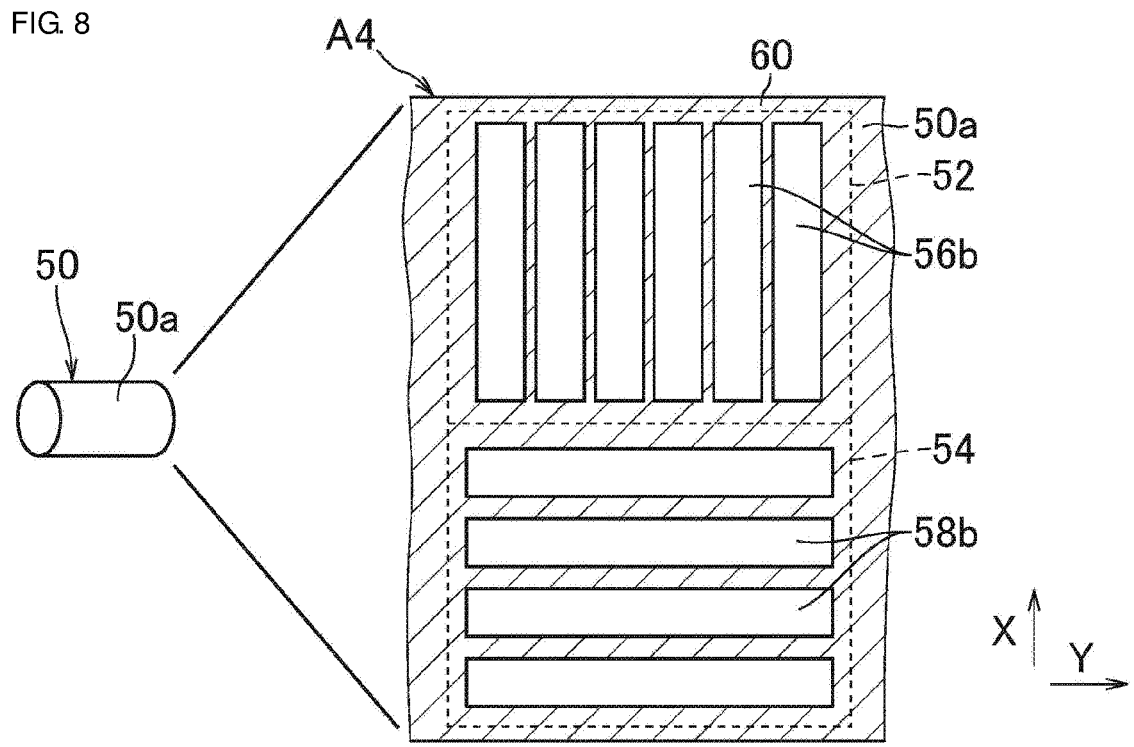
FIG. 8 illustrates the configuration of a gravure printing plate according to a third modified example of a preferred embodiment of the present invention.

FIG. 8 illustrates the configuration of a gravure printing plate according to a third modified example of a preferred embodiment of the present invention.

As in the gravure printing plate A1, in a gravure printing plate A4, plural cells corresponding to at least two patterns to be printed are disposed on a peripheral surface 50a of a cylindrical or substantially cylindrical gravure roller 50, as shown in FIG. 8. First and second regions 52 and 54 are provided on the peripheral surface 50a of the gravure roller 50 and are arranged side by side along the rotation direction (X direction) of the gravure roller 50. Cells 56b corresponding to one of the two patterns are disposed in the first region 52, while cells 58b corresponding to the other one of the two patterns are disposed in the second region 54.

The cells 56b disposed in the first region 52 of the gravure printing plate A4 are the same as those in the first region 52 of the gravure printing plate A2, and an explanation thereof will thus be omitted. The cells 58b disposed in the second region 54 of the gravure printing plate A4 are the same as those in the second region 54 of the gravure printing plate A3, and an explanation thereof will thus be omitted.

In the gravure printing plate A4 of the third modified example, each of the cells 56b preferably has a bar shape such that it is continuously disposed along the rotation direction of the gravure roller 50 and has a predetermined width in a direction perpendicular or substantially perpendicular to the rotation direction of the gravure roller 50. The cells 56b are thus formed without dent portions. Each of the cells 58b preferably has a bar shape such that it is continuously disposed along a direction perpendicular or substantially perpendicular to the rotation direction of the gravure roller 50 and has a predetermined width in the rotation direction of the gravure roller 50. The cells 58b are thus formed without dent portions. With this configuration, upon the occurrence of printing misregistration in the rotation direction of the gravure roller 50 and in a direction perpendicular or substantially perpendicular to the rotation direction, adjustment to the stacking position of the pattern printed by the cells 58b in the second region 54 on the pattern printed by the cells 56b in the first region 52 is able to be performed more easily than by using the gravure printing plate A1. As a result, the productivity is further improved.

Upon the occurrence of stacking misregistration in the rotation direction of the gravure printing plate A4 and in a direction perpendicular or substantially perpendicular to the rotation direction, that is, in the printing direction and in a direction perpendicular or substantially perpendicular to the printing direction, adjustment to the stacking position is easily made, as in the occurrence of printing misregistration. As a result, the productivity is further improved.

In the multilayer ceramic capacitor 10 including inner electrodes printed by using the cells 56b provided in the first region 52 and the cells 58b provided in the second region 54 of the gravure printing plate A4, the widths of the extended electrode portions extending to both end surfaces and those extending to both side surfaces of the multilayer body 12 are increased. This configuration encourages the flowing of a current in the electronic component, and the equivalent series inductance (ESL) is thus decreased. Hence, the characteristics of the electronic component are improved.

An experiment conducted by the present inventors to examine the advantages of various preferred embodiments of the present invention will be discussed below.

Figure 9A:
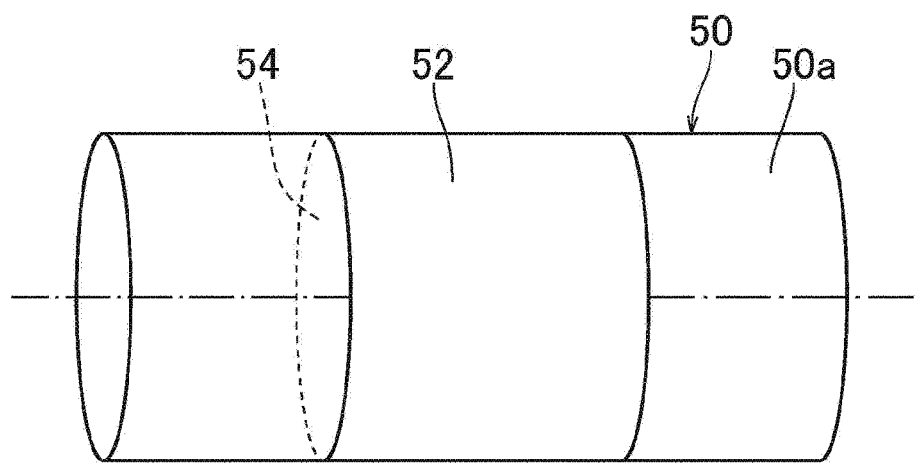
FIG. 9A illustrates a gravure printing plate prepared for measuring the amounts of misregistration after printing.
Figure 9B:
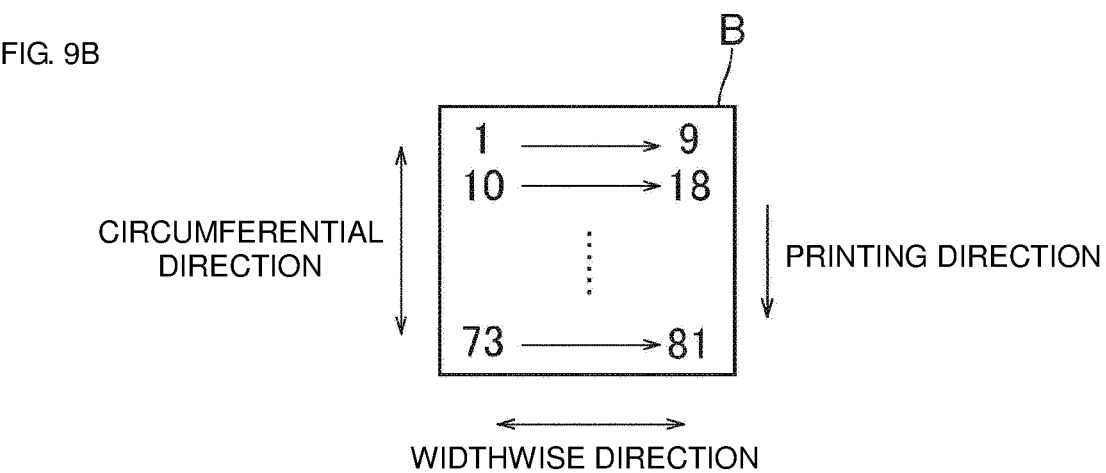
FIG. 9B illustrates reference positions used for measuring the amounts of misregistration in a printed area.

FIG. 9A illustrates a gravure printing plate prepared for measuring the amounts of misregistration after printing. FIG. 9B illustrates reference positions used to measure the amounts of misregistration in a printed area.

In this experiment, by using the gravure printing plate A1, a pattern was printed in an area B on a first sheet by using the cells 56a in the first region 52. Then, based on the area B on the first sheet as a reference, the amounts of misregistration of patterns on second and third sheets printed by using the cells 56a were measured. Similarly, based on the area B as a reference, the amounts of misregistration of patterns on first through third sheets printed by using the cells 58a in the second region 54 were measured.

The specifications of a multilayer ceramic capacitor assumed for conducting the above-described experiment are as follows. The dimensions are design values.

Dimensions of multilayer ceramic capacitor: L×W×T=1030 µm×640 µm×440 µm

Thickness of ceramic layer: 0.75 µm

Dimensions of multilayer body: L×W×T=970 µm×580 µm×420 µm

Underlying electrode layer: baked electrode layer

Metal of baked electrode layer: Cu

Plated layer: two-layered structure of Ni plated layer (average thickness of 4 µm) and Sn plated layer (average thickness of 4 µm)

Material for inner electrodes: Ni

The number of stacked inner electrodes: 270

Average thickness of inner electrodes: 0.55 µm

Average length L of L gap: 60 µm

Average width W of W gap: 55 µm

An evaluation method for the amounts of misregistration is as follows. As shown in FIG. 9A, the first and second regions 52 and 54 are provided on the peripheral surface 50a of the gravure roller 50. As shown in FIG. 9B, in the area B on the first sheet on which a pattern was printed by using the cells 56a in the first region 52, the reference positions for measuring the amounts of misregistration were determined as follows. Nine points were set per row at equal intervals in a direction perpendicular or substantially perpendicular to the rotation direction of the gravure roller 50, and then, nine rows were set at equal intervals in the rotation direction of the gravure roller 50. A total of eighty-one points were set as the reference positions.

Based on the eighty-one points on the first sheet as the reference positions, the amounts of misregistration in the rotation direction of the gravure roller 50 and those in a direction perpendicular or substantially perpendicular to the rotation direction were measured for eighty-one points on the second sheet and those on the third sheet, corresponding to those on the first sheet, on which the pattern was printed by using the cells 56$a$ in the first region 52.

Based on the above-described eighty-one points on the first sheet as the reference positions, the amounts of misregistration in the rotation direction of the gravure roller 50 and those in a direction perpendicular or substantially perpendicular to the rotation direction were measured for printing positions on the first through third sheets on which a pattern was printed by using the cells 58$a$ in the second region 54.

The amounts of misregistration in the rotation direction of the gravure roller 50 will first be examined. A maximum of about 25 μm of misregistration was found as a result of comparing the area printed by using the cells 56$a$ in the first region 52 and the areas printed by using the cells 58$a$ in the second region 54. A maximum of about 10 μm of misregistration was found as a result of comparing the areas printed by using the cells 56$a$ in the first region 52.

The amounts of misregistration in a direction perpendicular or substantially perpendicular to the rotation direction of the gravure roller 50 will now be examined. A maximum of about 10 μm of misregistration was found as a result of comparing the area printed by using the cells 56$a$ in the first region 52 and the areas printed by using the cells 58$a$ in the second region 54. A maximum of about 10 μm of misregistration was found as a result of comparing the areas printed by using the cells 56$a$ in the first region 52.

The above-described results show that, by the use of gravure printing plate A1, the precision in the printing position in a direction perpendicular or substantially perpendicular to the rotation direction of the gravure roller 50 tends to be higher than that in the rotation direction of the gravure roller 50.

Concerning the configuration of cells used in a gravure printing plate, a bar shape in which it is continuously disposed along the rotation direction of a gravure roller and has a predetermined width in a direction perpendicular or substantially perpendicular to the rotation direction of the gravure roller, such as the cells 56$b$ in the first modified example, may effectively be used. By using the cells having such a configuration, the occurrence of printing misregistration in the rotation direction of the gravure roller of the gravure printing plate can safely be ignored.

The present invention is not restricted to the above-described preferred embodiment and modified examples, and various other modifications may be made within the scope of the present invention.

For example, in the above-described preferred embodiments, the first and second regions 52 and 54 preferably are arranged side by side in the rotation direction of the gravure roller 50, for example. The arrangement of the first and second regions 52 and 54 is not limited to this example. The first and second regions 52 and 54 may be arranged side by side in a direction perpendicular or substantially perpendicular to the rotation direction of the gravure roller 50. Alternatively, the first and second regions 52 and 54 may be arranged side by side in an oblique direction.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A gravure printing method comprising:
a step of performing printing by applying a printing material to a surface of a printing medium by using a gravure printing plate including:
a cylindrical or substantially cylindrical gravure roller including a peripheral surface; and
a plurality of cells disposed on the peripheral surface of the gravure roller, the plurality of cells corresponding to a pattern to be printed; wherein
at least two regions are provided on the peripheral surface of the gravure roller;
the pattern to be printed includes at least two patterns;
a first group of the plurality of cells corresponding to one of the at least two patterns is disposed in one of the at least two regions;
a second group of the plurality of cells corresponding to another one of the at least two patterns is disposed in another one of the at least two regions;
the first group of the plurality of cells are disposed in multiple rows in a first direction with respect to a rotation direction of the gravure roller;
the second group of the plurality of cells are disposed in multiple rows in a second direction with respect to the rotation direction of the gravure roller;
the first direction is different from the second direction;
each of the plurality of cells that are disposed in the one of the at least two regions has a shape and a size that is the same as or substantially the same as all remaining ones of the plurality of cells that are disposed in the one of the at least two regions;
each of the plurality of cells that are disposed in the another one of the at least two regions has a shape and a size that is the same as or substantially the same as all remaining ones of the plurality of cells that are disposed in the another one of the at least two regions; and
in the step of performing printing, the multiple rows of each of the first and second groups of the plurality of cells provides a plurality of electrodes.

2. The gravure printing method according to claim 1, wherein, in the step of performing printing, printing speeds for the at least two regions are the same or substantially the same.

3. The gravure printing method according to claim 1, wherein the first group of the plurality of cells defines a stripe-shaped pattern continuously disposed along the rotation direction of the gravure roller.

4. The gravure printing method according to claim 1, wherein the first group of the plurality of cells defines a bar shape which is continuously disposed along the rotation direction of the gravure roller and which has a predetermined width in a direction perpendicular or substantially perpendicular to the rotation direction of the gravure roller.

5. The gravure printing method according to claim 1, wherein the second group of the plurality of cells defines a stripe-shaped pattern continuously disposed along a direction perpendicular or substantially perpendicular to the rotation direction of the gravure roller.

6. The gravure printing method according to claim 1, wherein the second group of the plurality of cells defines a bar shape which is continuously disposed along the rotation direction of the gravure roller and which has a predetermined width in a direction perpendicular or substantially perpendicular to the rotation direction of the gravure roller.

7. The gravure printing method according to claim 1, wherein the at least two regions are arranged side by side in the rotation direction of the gravure roller.

8. The gravure printing method according to claim 1, wherein each of the plurality of cells includes dent portions.

9. The gravure printing method according to claim 1, wherein each of the plurality of cells are shaped to form the pattern to be printed to include a cross-shaped or substantially cross-shaped electrode.

10. The gravure printing method according to claim 1, wherein the plurality of cells are not continuously provided along the rotation direction of the gravure roller.

11. The gravure printing method according to claim 1, wherein the plurality of cells are not continuously provided along a direction perpendicular or substantially perpendicular to the rotation direction of the gravure roller.

12. The gravure printing method according to claim 1, wherein the at least two regions are arranged side by side in a direction perpendicular or substantially perpendicular to the rotation direction of the gravure roller.

13. The gravure printing method according to claim 1, wherein the at least two regions are arranged side by side in an oblique direction to the rotation direction of the gravure roller.

14. The gravure printing method according to claim 1, wherein
the first direction is along or substantially along the rotation direction of the gravure roller; and
the second direction is perpendicular or substantially perpendicular to the rotation direction of the gravure roller.

15. A manufacturing method for an electronic component, comprising:
a step of performing printing by applying a conductive paste to a surface of a substrate for the electronic component by using a gravure printing plate including:
a cylindrical or substantially cylindrical gravure roller including a peripheral surface; and
a plurality of cells disposed on the peripheral surface of the gravure roller, the plurality of cells corresponding to a pattern to be printed; wherein
at least two regions are provided on the peripheral surface of the gravure roller;
the pattern to be printed includes at least two patterns;
a first group of the plurality of cells corresponding to one of the at least two patterns is disposed in one of the at least two regions;
a second group of the plurality of cells corresponding to another one of the at least two patterns is disposed in another one of the at least two regions;
the first group of the plurality of cells are disposed in multiple rows in a first direction with respect to a rotation direction of the gravure roller;
the second group of the plurality of cells are disposed in multiple rows in a second direction with respect to the rotation direction of the gravure roller;
the first direction is different from the second direction;
each of the plurality of cells that are disposed in the one of the at least two regions has a shape and a size that is the same as or substantially the same as all remaining ones of the plurality of cells that are disposed in the one of the at least two regions;
each of the plurality of cells that are disposed in the another one of the at least two regions has a shape and a size that is the same as or substantially the same as all remaining ones of the plurality of cells that are disposed in the another one of the at least two regions;
in the step of performing printing, the multiple rows of each of the first and second groups of the plurality of cells provides a plurality of electrodes; and
the plurality of electrodes provide a plurality of electrodes included in the electronic component.

16. The manufacturing method according to claim 15, wherein, in the step of performing printing, printing speeds for the at least two regions are the same or substantially the same.

17. The manufacturing method according to claim 15, wherein
the first direction is along or substantially along the rotation direction of the gravure roller; and
the second direction is perpendicular or substantially perpendicular to the rotation direction of the gravure roller.

18. The manufacturing method according to claim 15, wherein the electronic component is a multilayer ceramic capacitor.

19. The manufacturing method according to claim 18, wherein the multilayer ceramic capacitor is a three-terminal multilayer ceramic capacitor.

20. The manufacturing method according to claim 18, wherein the multilayer ceramic capacitor includes a multilayer body with a rectangular or substantially rectangular parallelepiped shape.

* * * * *